May 19, 1936.  W. WHARTON  2,041,446
VARIABLE SPEED POWER TRANSMISSION MECHANISM
Filed April 17, 1935    6 Sheets-Sheet 1

INVENTOR
William Wharton.
BY
ATTORNEY

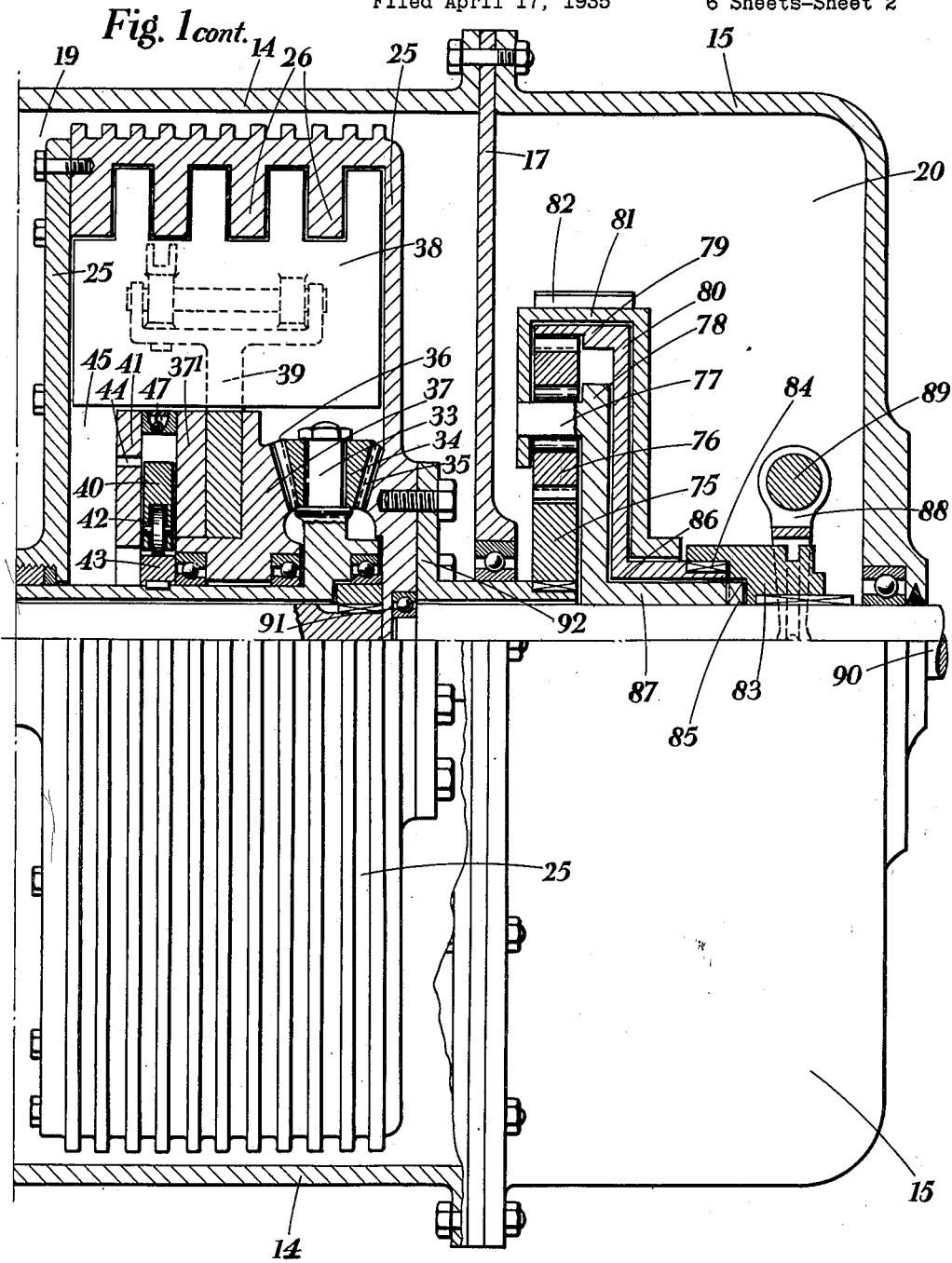

May 19, 1936.   W. WHARTON   2,041,446
VARIABLE SPEED POWER TRANSMISSION MECHANISM
Filed April 17, 1935   6 Sheets-Sheet 3

INVENTOR
William Wharton
BY
[signature]
ATTORNEY

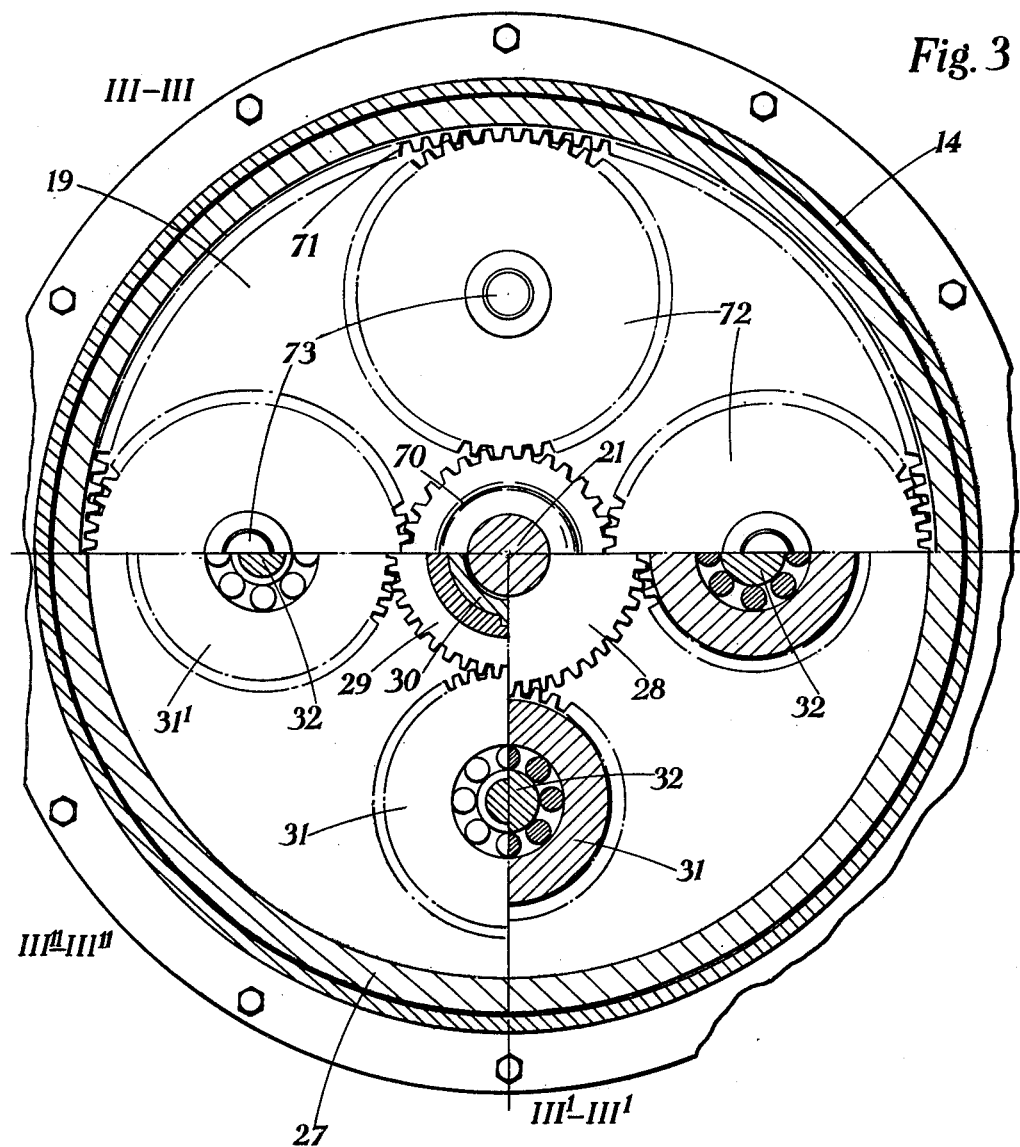

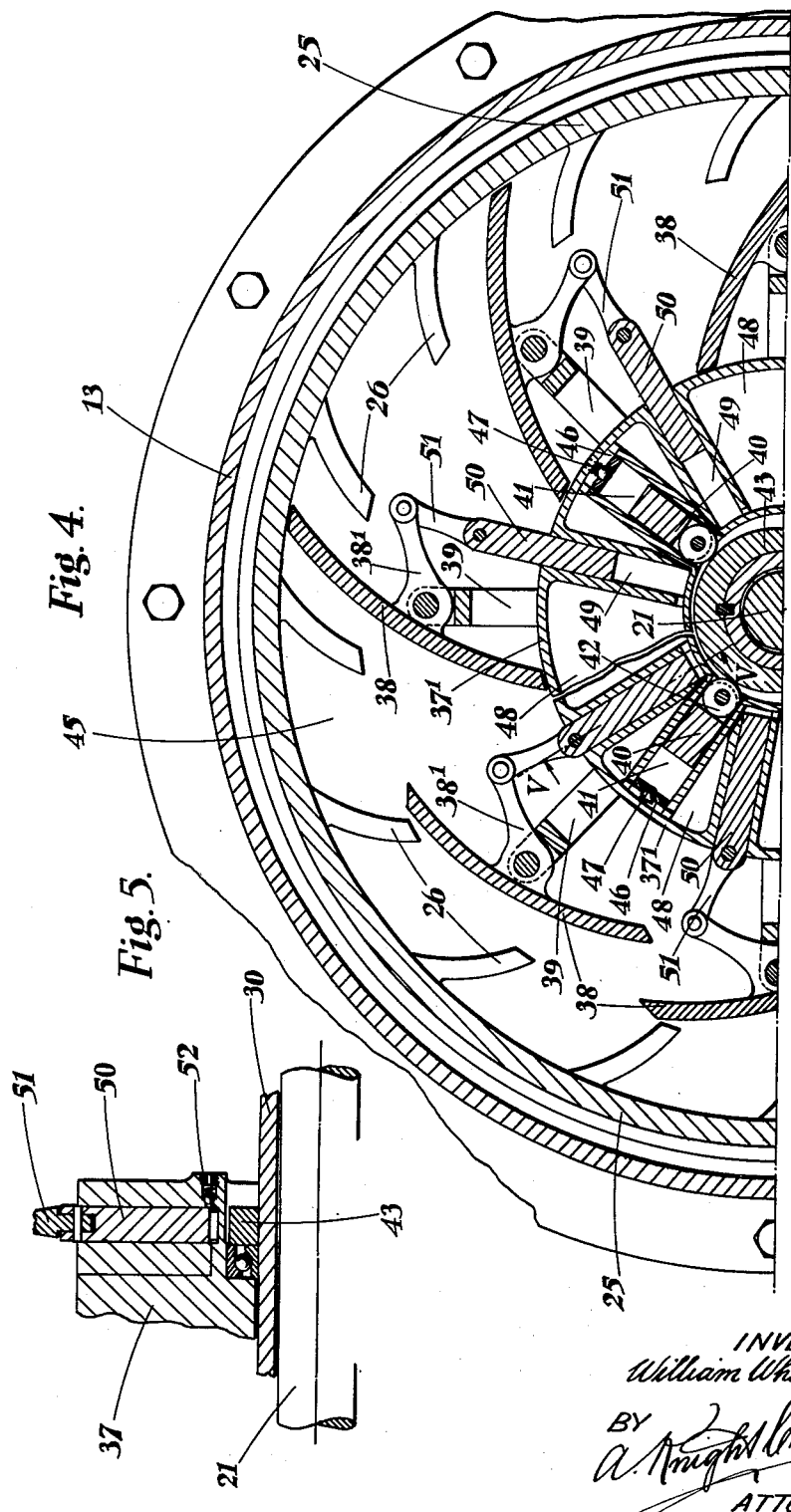

Patented May 19, 1936

2,041,446

UNITED STATES PATENT OFFICE 2,041,446

VARIABLE SPEED POWER TRANSMISSION MECHANISM

William Wharton, Kendal, Westmorland, England

Application April 17, 1935, Serial No. 16,863
In Great Britain April 23, 1934

9 Claims. (Cl. 74—293)

This invention relates to a variable speed power transmission mechanism or gearing, the ratio of which is controlled by the torque requirements of a driven member in relation to the power available on a driving member, and is adapted to be used in combination with any suitable type of variable resistance coupling, such as a fluid fly-wheel, hydraulic torque converter, friction clutch, pump or pumps, or any similar mechanical device, the resistance of which can be controlled either manually or mechanically.

This invention has for its object the provision of a gearing of simple construction, the ratio of which is adjusted automatically according to varying conditions of speed and load to provide a smooth transmission of power from the driving member to the member to be driven, and to this end the mechanism consists in the combination with a variable resistance coupling having driving and driven members, of a torque-dividing train and a driving train of gearing, the torque-dividing train being connected to the driving train and to the driving and driven members of the variable coupling, the driving train being arranged to transmit the drive from a driving shaft to a driven shaft, the arrangement being such that the torque reaction is divided in the torque-dividing train into two opposing forces which are transmitted to the driving and driven members respectively of the variable coupling where they tend to neutralize each other.

Also means may be provided for preventing any reverse rotation of the intermediate gear elements of the torque-dividing train of gearing about the axis of the driving shaft; further, means may also be provided for giving a reverse rotation to the driven shaft relative to that of the driving shaft.

The invention will be described with reference to the accompanying drawings in which:—

Figure 3 is a composite transverse section on the lines III—III, III¹—III¹ and III¹¹—III¹¹ of Figure 2;

Figure 4 is a transverse section on the line IV—IV of Figure 2 showing the driven members of the coupling in the open and closed positions, and, Figure 5 is a longitudinal section on the line V—V of Figure 4 illustrating a detail of the coupling.

Figure 1:
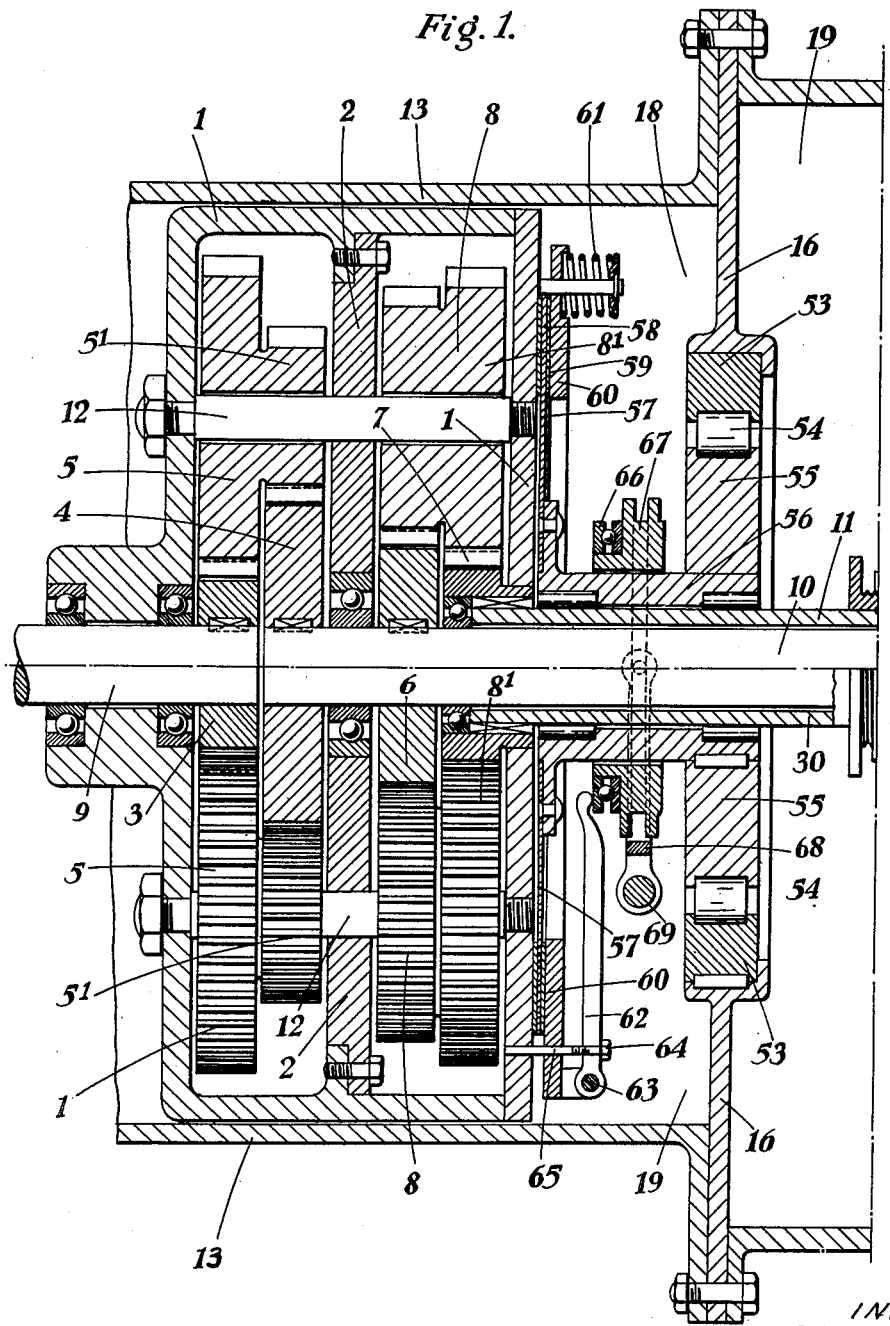
Figure 1 is a longitudinal elevation partly in section of one embodiment of the mechanism.

In the embodiment illustrated in Figure 1 the mechanism is disposed within a housing comprising three cylindrical casings 13, 14 and 15 mounted end to end coaxially with each other and bolted together and having dividing walls or partitions 16 and 17 disposed between each casing, thus forming three chambers 18, 19 and 20. A cylindrical casing or drum 1 is mounted in the chamber 18 and is divided into two substantially equal chambers by means of a central partition 2 arranged parallel to its ends. A train of epicyclic gearing, hereafter termed the driving train and comprising a driving sun wheel 3, a driven sun wheel 4 and planet wheels 5, 5¹ is located in one of the chambers and a second train of epicyclic gearing, hereafter termed the torque-dividing train, comprising a driving sun wheel 6, a driven sun wheel 7 and planet wheels 8, 8¹, is located in the other chamber. The driving sun wheel 3 is secured on the inner end of a driving shaft 9 which is rotatably mounted in a bearing in one end wall of the casing 1, and the driven sun wheel 4 is secured on the inner end of a driven shaft 10 which is rotatably mounted in the partition 2 and extends through and beyond the other end wall of the casing 1 and into the chamber 19, coaxial with the driving shaft 9; the driving sun wheel 6 is also secured on the driven shaft 10 and the driven sun wheel 7 is secured on one end of a sleeve 11 rotatably mounted on the driven shaft 10 and extending into the chamber 19. The planet wheels 5, 5¹ and 8, 8¹ of each train are rotatably mounted on spindles 12 secured in the end walls of the casing 1, the wheels 5 and 5¹ being connected together as are also the wheels 8 and 8¹ and the wheels 5 and 5¹ engage the driving and driven sun wheels 3 and 4 of the driving train respectively, also the wheels 8 and 8¹ engage the driving and driven sun wheels 6 and 7 of the torque-dividing train respectively. In order to obtain a reduction of speed between the driving and driven shafts 9 and 10 the driven sun wheel 4 is of a larger diameter than the driving sun wheel 3 and in the torque-dividing train the sun wheel 6 is of a larger diameter than the sun wheel 7. The variable resistance coupling which in this embodiment is of the fluid fly-wheel type is mounted in the chamber 19 on the driven shaft 10 and comprises a cylindrical casing 25 securely connected to the driven shaft 10 and having a plurality of inwardly projecting driving members or vanes 26 disposed round its inner periphery. The sleeve 11 extends into the casing 25 and on the end of this sleeve 11 a plurality of radially disposed spindles 33 are provided on which are rotatably mounted bevel pinions 34 arranged to mesh with a bevel gear wheel 35 formed on the end wall of the casing 25 and also with a second bevel gear wheel 36 formed on a sleeve member 37 rotatably mounted on the sleeve 30 and the driven vanes 38 are pivotally mounted on the outer ends of arm 39 clamped between the member 37 and a member 37¹ secured to the member 37. A plurality of pump plungers 40 disposed in radially disposed cylinders 41 in the sleeve member 37 are provided with rollers 42 at their inner ends adapted to bear against a cam 43 secured on the sleeve 30 and the cylinders 41 are provided with inlet ports 44 which communicate with the oil space 45 within the casing 25 and are provided with outlet ports 46 furnished with non-return valves 47 which communicate with an annular oil chamber 48 within the sleeve member 37. The chamber 48 communicates with a second set of cylinders 49 in the sleeve member 37 in which are disposed a plurality of rams 50 connected at their outer ends through links 51 to arms 38¹ on the driven vanes 38. Non-return valves 52 (Figure 5) are provided in the member 37 for relieving the oil pressure in the annular chamber 48 in the event of this increasing beyond a given maximum.

In order to prevent a reverse rotation of the gear casing 1 a free-wheel device is provided comprising a fixed annular member 53 mounted in the partition 16, a plurality of rollers 54 and an inner rotating member 55 secured on a short sleeve 56 rotatably mounted on the sleeve 11 and connected by means of a friction clutch to the gear casing 1. The clutch comprises a thin plate or disc 57 secured to the sleeve 56 with its rim located between friction linings 58 and 59 of fabric or other suitable material on the end wall of the casing 1 and a ring 60 respectively, the ring 60 being normally pressed towards the gear casing 1 by means of three coil springs 61 spaced evenly round the ring 60 thus gripping the plate 57 between the linings 58 and 59. For the purpose of releasing the clutch three levers 62 spaced between the springs 61 pivoted at their outer ends at 63 to the ring 60 are provided, said levers being furnished with set screws 64 adapted to bear against the ends of studs 65 provided on the gear casing 27. The inner ends of the levers 62 are arranged to bear against a thrust race 66 on an annular grooved member 67 slidably mounted on the short sleeve 56, a sliding movement being imparted to said member 67 by a forked lever 68 secured on a shaft 69 mounted in the casing 14 and connected to suitable operaing means such as a pedal or a hand lever not shown.

A secondary driven shaft 90 extends through the chamber 20 and into the chamber 19 with its inner end mounted in a bearing 91 on an end wall of the casing 25 of the variable coupling and its outer end is adapted to be connected to a member to be driven, such as the propeller shaft of a motor road vehicle. A further train of epicyclic gearing, hereafter termed the reverse train, is mounted on the secondary driven shaft 90 within the chamber 20 and comprises a sun wheel 75 secured to the sleeve portion of a plate 92 bolted to the end wall of the casing 25 of the variable coupling, a plurality of planet wheels 76 rotatably mounted on spindles 77 secured to a plate or spider 78 rotatably mounted on the secondary driven shaft 90 and an annular or internally toothed gear wheel 79 secured to or formed in one with the rim of a disc-shaped member 80 rotatably mounted on the spider 78. This train of gearing with the spider 78 and member 80 is mounted within a brake drum 81 which is connected to the spindles 77 and a contracting brake band 82 surrounds and coacts with said drum 81, being operated by any suitable means such as a pedal or hand lever not shown. A grooved member 83 mounted to rotate with and to slide along the secondary driven shaft 90 is provided with two sets of dogs or teeth 84 and 85 which coact with similar dogs on the cylindrical or bearing portions 86 and 87 of the spider 78 and member 80 respectively, the dogs 84 being of greater length than the dogs 85. The member 83 is moved along the secondary driven shaft 90 to engage or disengage the dogs 85 by means of a forked lever 88 secured on a shaft 89 mounted in the casing 15 and connected to suitable operating means such as a pedal or hand lever not shown.

The operation of this embodiment of the mechanism will be described assuming the following conditions:—

1. That the mechanism is mounted in the transmission system of a motor road vehicle.
2. That the driving shaft 9 is connected to the crank shaft of the engine of the vehicle which is rotating in the normal clockwise direction.
3. That the secondary driven shaft 90 is connected through the propeller shaft and axle to the driving road wheels of the vehicle which are held stationary by the vehicle brakes.
4. That the clutch is disengaged to put the free wheel device out of action so that the gear casing 1 is free to rotate in either direction, and,
5. That the controls for the reverse train of gearing are set in the forward position so as to give a clockwise rotation of the secondary driven shaft 90 for a similar rotation of the shaft 10.

The working and method of operation of the clutch and free wheel and of the reverse gear will be described later.

With these assumptions the planet wheels 5, 5¹ of the driving train of gearing will rotate in an anti-clockwise direction about their spindles 12, which latter with the casing 1 will also rotate in an anti-clockwise direction about the driving and driven shafts 9 and 10; this latter rotation is transmitted to the planet wheels 8, 8¹ of the torque-dividing train, and, since the driving sun wheel 6 of this latter train is fixed to the driven shaft 10, the planet wheels 8 and 8¹ of this train will also rotate in an anti-clockwise direction about their spindles 12. In the torque-dividing train of gearing since the planet wheels 8¹ which mesh with the driven sun wheel 7 are of a larger diameter than the planet wheels 8 which mesh with the driving sun wheel 6, the driven sun wheel 7 of this train with the sleeve 11 and the radial spindles 33 thereon are caused to rotate in a clockwise direction.

Consequently the bevel pinions 34 in the coupling will rotate round the bevel gear 35 on the casing 25 which is stationary, so that the sleeve member 37 and driven vanes 38 will be caused to rotate by means of the bevel gear 36 within the casing 25 and driving vanes 26. Since the member 37 rotates at a greater speed than the sleeve 11, the cam 43 will operate the plungers 40 so that oil is forced into the chamber 48 and the rams 50 are forced outwardly, thus turning the driven vanes 38 into a position in which they offer a greater resistance to rotation relative to the driving vanes 26. The torque reaction or resistance to rotation acting in an anti-clockwise direction on the spindles 12 is divided into two torsional forces acting in opposite directions, said forces being transmitted through the driving and driven sun wheels 6 and 7 respectively of the torque-dividing train to the driving and driven members 26 and 38 respectively of the coupling where they tend to neutralize or balance out each other. As the resistance in the coupling increases, the load on the driving sun wheel 6 of the torque-dividing train also increases, being transmitted through its planet wheels 8 and $8^1$ and the driving and driven sun wheels 6 and 7 of this train with the driving and driven members 26 and 38 of the coupling, to which they are respectively connected, tend to become locked together, thereby tending to prevent the spindles 12 and the casing 1 from rotating about the driven shaft 10.

When the vehicle brakes are released and the power on the driving shaft 9 is increased and overcomes the load on the secondary driven shaft 90, this shaft 90 and the driven shaft 10 with its sun wheels 4 and 6 commences to rotate in a clockwise direction and the balance of pressure between the driving and driven sun wheels 6 and 7 of the torque-dividing train is maintained by means of the coupling. As the load on the driven shaft 10 continues to be reduced the torque reaction on the spindles 12 is also reduced, thereby allowing these spindles 12 and the casing 1 to rotate in a clockwise direction about the driven shaft 10.

As the load on the driven shaft 10 and the reaction on the spindles 12 is still further reduced, the relative speed between the driving and driven sun wheels 6 and 7 of the torque-dividing train is also reduced until a point is reached when these two wheels 6 and 7 are rotating at the same speed. When this occurs there is no slip in the coupling and the torque requirements of the driven shaft 10 are entirely supplied and balanced by the power on the driving shaft 9. In this state all the gear wheels of both trains will be locked relative to each other and a direct drive will be obtained through the mechanism from the driving shaft 9 to the driven shaft 10.

If desired the two trains of gearing may be mounted in separate casings which are connected together in any suitable manner.

The operation of the clutch and free-wheel device is as follows:—When the grooved member 67 is moved along the sleeve 56 toward the clutch plate 57 by means of the forked lever 68, the levers 62 are caused to move about their fulcrums at the ends of the studs 65, thus causing the ring 60 to move away from the gear casing 1 against the action of the springs 61 and releasing the grip on the clutch plate 57 so that the free-wheel member 55 is disconnected from the gear casing 1 and the latter is free to rotate in either direction. When the grooved member 67 is moved towards the free-wheel member 55, the levers 62 are released and the springs 61 force the ring 60 towards the gear casing 1, thus gripping the clutch plate 57 and connecting the casing 1 to the free-wheel member 55 so that the casing 1 is free to rotate in a clockwise direction only.

When the free-wheel device is engaged and the power and load conditions on the driving and driven shafts 9 and 10 respectively are such as to cause the gear casing 1 to tend to rotate in an anti-clockwise direction, the greater part of the torque reaction will be transmitted from the gear casing 1 to the housing through the clutch, free-wheel and partition 16, and the remainder of the torque reaction will be divided into two portions and transmitted through the sun wheels 6 and 7 to the driving and driven vanes 26 and 38 of the coupling where they balance out each other.

The operation of the reverse train of gearing in the chamber 20 is as follows:—When it is desired that the secondary driven shaft 90 shall rotate in the same direction as the driven shaft 10, the brake band 82 is released from the drum 81 and the member 83 is moved by means of the forked lever 88 toward the reverse train so that both sets of dogs 84 and 85 are engaged and the members 78, 80 and 83 are locked together and to the secondary driven shaft 90 and the planet wheels 76 are unable to rotate on their spindles 77 so that the reverse train will rotate as a unit on the secondary driven shaft 90 and a direct drive is obtained from the driven shaft 10 to the secondary driven shaft 90. When it is desired that the secondary driven shaft 90 shall rotate in the reverse direction to that of the driven shaft 10 the brake band 82 is contracted on to the drum 80 to prevent the latter from rotating and the member 83 is moved away from the reverse train by means of the forked lever 88 until the dogs 85 are disengaged from the coacting dogs on the portion 87 of the member 78. The dogs 84 are not disengaged from the coacting dogs on the portion 86 of the member 80 so that this latter member 80 with the annular wheel 79 remains locked to the secondary driven shaft 90. Thus when the driven shaft 10 and sun wheel 75 rotate in a clockwise direction the planet wheels 76 rotate in an anticlockwise direction about their spindles 77, which latter are fixed, being held against rotation by the brake drum 81; consequently the annular wheel 79 with the members 80 and 83 and the secondary driven shaft 90 will be driven in an anti-clockwise direction at a reduced speed to that of the driven shaft 10.

Figure 2:
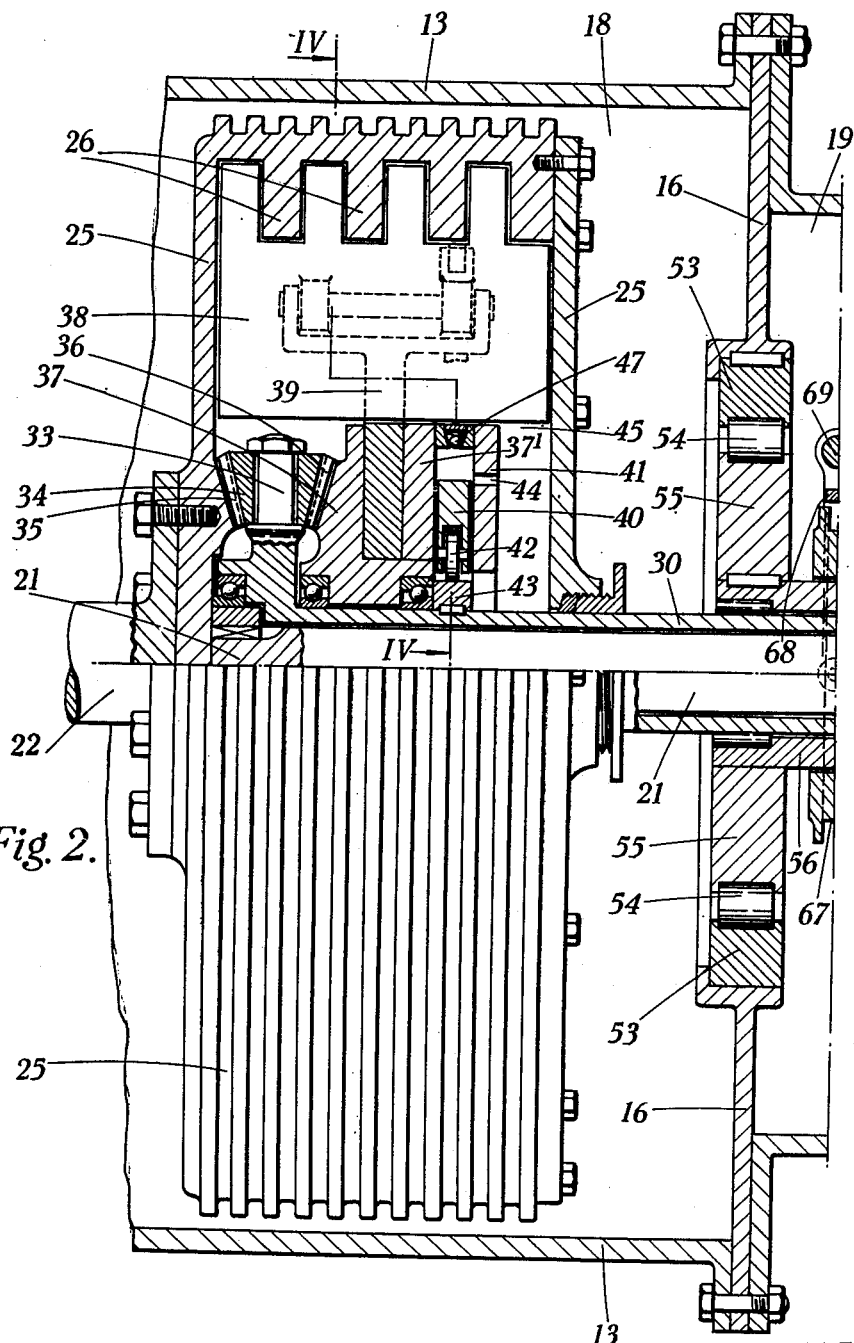
Figure 2 is a longitudinal elevation partly in section of an alternative form of the mechanism.
Figure 2:
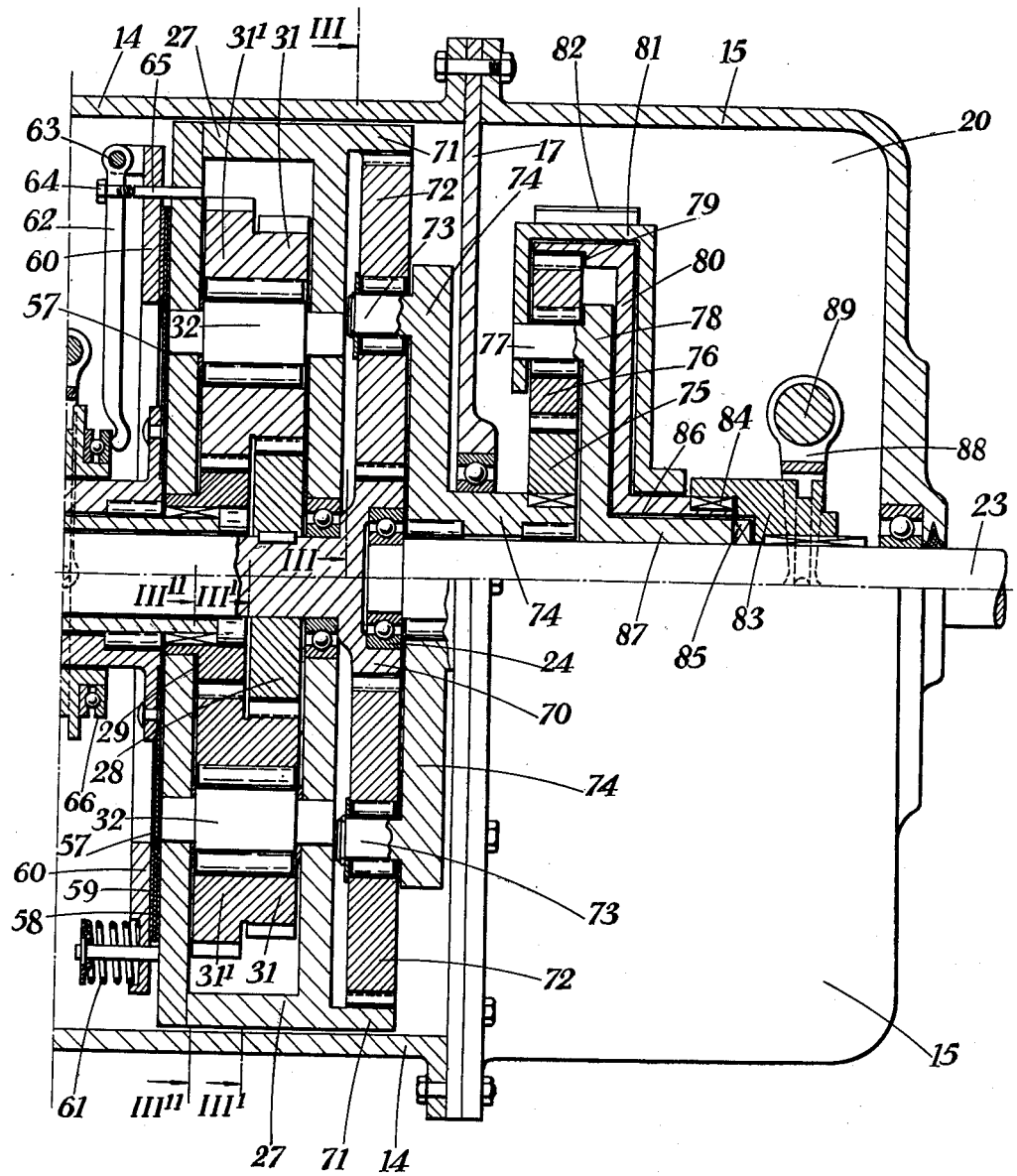

In the embodiment illustrated in Figure 2 the mechanism is disposed within a housing similar to that described in the previous embodiment and a driving shaft 21 extends coaxially through the chamber 18 and into the chamber 19, its outer end being connected to a suitable source of power, such as the crank-shaft 22 of an internal combustion engine and a driven shaft 23 extends through the chamber 20 and into the chamber 19 with its inner end mounted in a bearing 24 on the inner end of the driving shaft 21 and its outer end is adapted to be connected to a member to be driven, such as the propeller shaft of a motor road vehicle. The variable resistance coupling which is of a similar construction to that described in the previous embodiment, is mounted in the chamber 18 with its casing 25 securely connected to the driving shaft 21. The torque-dividing train of gearing is mounted within a gear casing or drum 27 which is located in the chamber 19 and rotatably mounted on and adjacent the inner end of the driving shaft 21 and this train comprises a driving sun wheel 28 secured on the driving shaft 21, a driven sun wheel 29 secured on one end of a sleeve 30 rotatably mounted on the driving shaft 21 and a plurality of planet wheels 31 and $31^1$ arranged in pairs and rotatably mounted on spindles 32 secured in the end walls of the gear casing 27. The wheels 31 mesh with the driving sun wheel 28 and are connected to the wheels $31^1$, which latter wheels mesh with the driven sun wheel 29 and in this embodiment the driving sun wheel 28 is of a larger diameter than the driven sun wheel 29. The sleeve 30 extends into the casing 25 of the coupling, the radially disposed spindles 33 being mounted on the end of this sleeve 30.

In order to prevent a reverse rotation of the gear casing 27, a free-wheel device is provided in the partition 16 and is connected to the casing 27 by means of a friction clutch, the free-wheel device and the clutch being similar to those described in the previous embodiment, and in this embodiment the friction lining 58 is secured on the end wall of the casing 27.

The driving train of epicyclic gearing is located adjacent the rear end wall of the gear casing 27 and comprises a driving sun wheel 70 secured on the inner end of the driving shaft 21, a driven wheel comprising an annular or internally toothed wheel 71 formed on an extension of the cylindrical wall of the gear casing 27 and a plurality of planet wheels 72 disposed between and meshing with the sun wheel 70 and the annular wheel 71, said planet wheels 72 being rotatably mounted on spindles 73 secured to a spider or plate 74 rotatably mounted on the driven shaft 23. A reverse train of gearing similar to that described in the previous embodiment is mounted on the driven shaft 23 within the chamber 20 with the sun wheel 75 secured to the spider 74.

The operation of this embodiment of the mechanism will be described, assuming similar conditions as to the driving and driven shafts, clutch and reverse gears, to those set out for the operation of the previous embodiment.

With these assumptions the sun wheel 70 of the driving train will rotate in a clockwise direction and the planet wheels 72 of the driving train will rotate in an anti-clockwise direction about their spindles 73, which latter are fixed, since they are mounted on the spider 74 which is connected to the driven shaft 23 and the annular gear wheel 71 of this driving train together with the gear casing 27 and the spindles 32 of the torque-dividing train will be driven in an anticlockwise direction and, since the driving sun wheel 28 of this train is secured to the driving shaft 21, the planet wheels 31 and 31¹ of this latter train will also rotate in an anti-clockwise direction about their spindles 32.

In the first torque-dividing train, since the driving sun wheel 28 is of a larger diameter than the driven sun wheel 29, the latter sun wheel 29 will rotate in a clockwise direction at a greater speed than that of the driving shaft 21; consequently the bevel pinions 34 in the coupling will rotate round the bevel gear 35 on the casing 25 so that the sleeve member 37 and driven vanes 38 will be caused to rotate by means of the bevel gear 36 at a greater speed than the casing 25 and driving vanes 26. Since the member 37 also rotates at a greater speed than the sleeve 30 the cam 43 will operate the plungers 40 so that oil is forced into the chamber 48 and the rams 50 are forced outwardly, thus turning the driven vanes 38 into a position in which they offer a greater resistance to rotation relative to the driving vanes 26. The torque reaction or resistance to rotation acting on the mechanism is transmitted through the gear casing 27, the spindles 32 and the planet wheels 31 and 31¹ of the torque-dividing train of gearing and is divided between the driving and driven sun wheels 28 and 29 of this train and the two portions of the torque reaction are then transmitted to the driving and driven vanes 26 and 38 respectively of the hydraulic coupling where they tend to neutralize or balance out each other. As the resistance to slip in the hydraulic coupling increases, the tendency is to cause the driven sun wheel 29 of the torque-dividing train to rotate at the same speed as the driving sun wheel 28 of this train, thereby tending to prevent the anticlockwise rotation of the gear casing 27 and the spindles 32, and tending to cause them to rotate in a clockwise direction.

When the vehicle brakes are released and the power on the driving shaft 21 is increased and overcomes the load on the driven shaft 23, this latter shaft 23 with the spider 74 of the driving train of gearing will commence to rotate in a clockwise direction and the speed of the annular gear wheel 71, gear casing 27 and planet wheel spindles 32 of the torque-dividing train rotating in an anti-clockwise direction will gradually be reduced until they cease to rotate and thereafter as the load on the driven shaft 23 is reduced relative to the power on the driving shaft 21 they will commence to rotate in a clockwise direction; at the same time the torque reaction on the gear casing 27 and planet wheel spindles 32 of the torque-dividing train will be reduced and the balance of pressure between the driving and driven sun wheels 28 and 29 of this train is maintained by means of the hydraulic coupling.

As the load on the driven shaft 23 and the reaction on the gear casing 27 and planet spindles 32 is still further reduced, the relative speed between the driving and driven sun wheels 28 and 29. of the torque-dividing train is also reduced until a point is reached when these two wheels are rotating at the same speed. When this occurs slip in the hydraulic coupling ceases and the torque requirements of the driven shaft 23 are entirely supplied and balanced by the power on the driving shaft 21. In this state all the gear wheels of both trains and the gear casing 27 will be locked relative to each other and they will rotate as a unit with the driving and driven shafts 21 and 23 and a direct drive will be obtained through the mechanism.

When the free-wheel device is engaged and the power and load conditions on the driving and driven shafts 21 and 23 respectively are such as to cause the gear casing 27 to tend to rotate in an anti-clockwise direction, the greater part of the torque reaction will be transmitted from the gear casing 27 to the housing through the clutch, free-wheel and partition 16, and the remainder of the torque reaction will be divided into two portions and transmitted through the sun wheels 28 and 29 to the driving and driven vanes 26 and 38 of the coupling where they balance out each other.

If desired, in either embodiment the entire mechanism may be employed in the reverse direction, that is to say, the driven shaft as above described will become the driving shaft and be connected to the source of power, the driving shaft will become the driven shaft, and in this arrangement the reverse gearing, if employed, is preferably mounted on the shaft which becomes the driven shaft.

Also, the diameters of the gear wheels in any of the trains of gearing may be changed as required in order to obtain any desired increase or reduction of speed between the driving and driven shafts or between the driving and driven members of the coupling.

What I claim is:—

1. A variable speed power transmission mechanism comprising in combination with a variable resistance coupling having driving and driven members, two trains of epicyclic gearing having sun and planet wheels and comprising a torque-dividing train and a driving train, the torque-dividing train comprising a driving and a driven sun wheel and a plurality of planet wheels arranged in pairs with the two wheels of each pair connected together, a gear casing surrounding said torque-dividing train, a plurality of spindles mounted in the casing and on which the planet wheels are rotatably mounted, a shaft connected to the driving members of the coupling, to the driving sun wheel of the torque-dividing train and to a sun wheel of the driving train, a sleeve connecting the driven sun wheel of the torque-dividing train to the driven members of the coupling, means connecting the driving train to the planet wheel spindles of the torque-dividing train and means connecting the driving train to a second shaft.

2. A variable speed power transmission mechanism comprising in combination with a variable resistance coupling having driving and driven members, two trains of epicyclic gearing having sun and planet wheels and comprising a torque-dividing train and a driving train, means connecting the torque-dividing train to the driving train, a shaft connected to the driving members of the coupling, to the torque-dividing train and to the driving train, means connecting the driven members of the coupling to the torque-dividing train, means connecting the driving train to a second shaft, means for preventing a reverse rotation of the planet wheels of the torque-dividing train about the sun wheels and means for engaging and disengaging said last named means.

3. A variable speed power transmission mechanism comprising in combination with a variable resistance coupling having driving and driven members, two trains of epicyclic gearing having sun and planet wheels and comprising a torque-dividing train and a driving train, means connecting the torque-dividing train to the driving train, a shaft connected to the driving members of the coupling, to the torque-dividing train and to the driving train, means connecting the driven members of the coupling to the torque-dividing train, means connecting the driving train to a second shaft and means for obtaining a reverse rotation of said second shaft relative to that of said first named shaft.

4. A variable speed power transmission mechanism comprising in combination with a variable resistance coupling having driving and driven members, two trains of epicyclic gearing having sun and planet wheels and comprising a torque-dividing train and a driving train, the torque-dividing train comprising a driving and a driven sun wheel and a plurality of planet wheels arranged in pairs with the two wheels of each pair connected together, a gear casing surrounding said torque-dividing train, a plurality of spindles mounted in the casing and on which the planet wheels are rotatably mounted, a shaft connected to the driving members of the coupling, to the driving sun wheel of the torque-dividing train and to a sun wheel of the driving train, a sleeve connecting the driven sun wheel of the torque-dividing train to the driven members of the coupling, means connecting the driving train to the planet wheel spindles of the torque-dividing train, a free-wheel device having a moving member and a fixed member connected to a housing, a clutch having coacting members connected to said moving member and to said gear casing respectively, means for operating said clutch, a reverse train of epicyclic gearing comprising a sun wheel connected to the driving train, an internally toothed wheel and a plurality of planet wheels, a spider having a plurality of spindles on which said last named planet wheels are mounted, means for connecting said spider and said internally toothed wheel to the second shaft and means comprising a coacting brake drum and brake band for preventing any rotation of said spider.

5. A variable speed power transmission mechanism comprising in combination with a variable resistance coupling having driving and driven members, two trains of epicyclic gearing comprising a torque-dividing train and a driving train, each of said trains having two sun wheels and a plurality of planet wheels arranged in pairs with the two wheels of each pair connected together, a gear casing surrounding both trains, a plurality of spindles mounted in the gear casing and on each of which a pair of planet wheels of each train is rotatably mounted, a shaft connected to the driving members of the coupling, to one of the sun wheels of the torque-dividing train and to one of the sun wheels of the driving train, a second shaft connected to the other sun wheel of the driving train and a sleeve connected to the other sun wheel of the torque-dividing train and to the driven members of the coupling.

6. A variable speed power transmission mechanism comprising in combination with a variable resistance coupling having driving and driven members, two trains of epicyclic gearing having sun and planet wheels and comprising a torque-dividing train and a driving train, the torque-dividing train comprising a driving and a driven sun wheel and a plurality of planet wheels arranged in pairs with the two wheels of each pair connected together, a gear casing surrounding said torque-dividing train, a plurality of spindles mounted in the casing and on which the planet wheels are rotatably mounted, a shaft connected to the driving members of the coupling and to the driving sun wheel of the torque-dividing train, a sleeve connecting the driven sun wheel of the torque-dividing train to the driven members of the coupling, the driving train comprising a sun wheel connected to said shaft, an internally toothed wheel connected to the gear casing of the torque-dividing train and a plurality of planet wheels rotatably mounted on spindles on a spider connected to a second shaft.

7. A variable speed power transmission mechanism comprising in combination with a variable resistance coupling having driving and driven members, two trains of epicyclic gearing comprising a torque-dividing train and a driving train, each of said trains having two sun wheels and a plurality of planet wheels arranged in pairs with the two wheels of each pair connected together, a gear casing surrounding both trains, a plurality of spindles mounted in the gear casing and on each of which a pair of planet wheels of each train is rotatably mounted, a shaft connected to the driving members of the coupling, to one of the sun wheels of the torque-dividing train and to one of the sun wheels of the driving train, a second shaft connected to the other sun wheel of the driving train and a sleeve connected to the other sun wheel of the torque-dividing train and to the driven members of the coupling, means for preventing a reverse rotation of the planet wheels of the torque-dividing train about the sun wheels, means for engaging and disengaging said last named means, a third shaft coaxial with said second shaft and means for obtaining a reverse rotation of said third shaft relative to that of said second shaft.

8. A variable speed power transmission mechanism comprising in combination with a variable resistance coupling having driving and driven members, two trains of epicyclic gearing having sun and planet wheels and comprising a torque-dividing train and a driving train, the torque-dividing train comprising a driving and a driven sun wheel and a plurality of planet wheels arranged in pairs with the two wheels of each pair connected together, a gear casing surrounding said torque-dividing train, a plurality of spindles mounted in the casing and on which the planet wheels are rotatably mounted, a shaft connected to the driving members of the coupling and to the driving sun wheel of the torque-dividing train, a sleeve connecting the driven sun wheel of the torque-dividing train to the driven members of the coupling, the driving train comprising a sun wheel connected to the shaft, an internally toothed wheel connected to the gear casing of the torque-dividing train and a plurality of planet wheels rotatably mounted on spindles on a spider connected to a second shaft, means for preventing a reverse rotation of the planet wheels of the torque-dividing train about the sun wheels, means for engaging and disengaging said last named means and means for obtaining a reverse rotation of said second shaft relative to that of said first named shaft.

9. A variable speed power transmission mechanism comprising in combination with a variable resistance coupling having driving and driven members, a torque-dividing train of epicyclic gearing comprising a driving and a driven sun wheel and a plurality of planet wheels arranged in pairs with the two wheels of each pair connected together, a gear casing surrounding said torque-dividing train, a plurality of spindles mounted in the casing and on which the planet wheels are rotatably mounted, a shaft connected to the driving members of the coupling and to the driving sun wheel of the torque-dividing train, a sleeve connecting the driven sun wheel of the torque-dividing train to the driven members of the coupling, a driving train of epicyclic gearing comprising a sun wheel connected to the shaft, an internally toothed wheel connected to the gear casing of the torque-dividing train and a plurality of planet wheels rotatably mounted on spindles on a spider connected to a second shaft, a free-wheel device having a moving member and a fixed member connected to a housing, a clutch having coacting members connected to said moving member and to said gear casing respectively, means for operating said clutch, a reverse train of epicyclic gearing comprising a sun wheel connected to the driving train, an internally toothed wheel and a plurality of planet wheels, a spider having a plurality of spindles on which said last named planet wheels are mounted, means for connecting said last named spider and internally toothed wheel to the second shaft and means comprising a coacting brake drum and brake band for preventing any rotation of said last named spider.

WILLIAM WHARTON.